United States Patent
Bachovchin et al.

(10) Patent No.: US 7,464,555 B2
(45) Date of Patent: Dec. 16, 2008

(54) CATALYTIC COMBUSTOR FOR INTEGRATED GASIFICATION COMBINED CYCLE POWER PLANT

(75) Inventors: Dennis M. Bachovchin, Mauldin, SC (US); Thomas E. Lippert, Murrysville, PA (US)

(73) Assignee: Siemens Energy, Inc., Orlando, FL (US)

(*) Notice: Subject to any disclaimer, the term of this patent is extended or adjusted under 35 U.S.C. 154(b) by 685 days.

(21) Appl. No.: 11/122,567

(22) Filed: May 5, 2005

(65) Prior Publication Data

US 2006/0248872 A1 Nov. 9, 2006

(51) Int. Cl.
 *F02C 7/22* (2006.01)
 *F02C 7/26* (2006.01)
(52) U.S. Cl. .......................................... 60/777; 60/723
(58) Field of Classification Search ................... 60/777, 60/723, 39.822
 See application file for complete search history.

(56) References Cited

U.S. PATENT DOCUMENTS

| | | | |
|---|---|---|---|
| 3,868,817 A * | 3/1975 | Marion et al. ................. | 60/781 |
| 4,253,301 A | 3/1981 | Vogt | |
| 4,677,829 A | 7/1987 | Archer et al. | |
| 4,731,989 A | 3/1988 | Furuya et al. | |
| 4,833,878 A | 5/1989 | Sood et al. | |
| 5,295,350 A * | 3/1994 | Child et al. .................. | 60/780 |
| 5,359,847 A | 11/1994 | Pillsbury et al. | |
| 5,388,395 A | 2/1995 | Scharpf et al. | |
| 5,657,632 A | 8/1997 | Foss | |
| 5,675,971 A | 10/1997 | Angel et al. | |
| 5,865,023 A | 2/1999 | Sorensen et al. | |
| 5,901,547 A | 5/1999 | Smith et al. | |
| 5,934,065 A | 8/1999 | Bronicki et al. | |
| 6,174,159 B1 | 1/2001 | Smith et al. | |
| 6,201,029 B1 | 3/2001 | Waycuilis | |
| 6,343,462 B1 | 2/2002 | Drnevich et al. | |
| 6,519,945 B2 | 2/2003 | Arar et al. | |
| 6,588,212 B1 | 7/2003 | Wallace et al. | |
| 6,609,378 B2 | 8/2003 | Scott | |
| 6,619,043 B2 | 9/2003 | Bruck et al. | |
| 6,640,548 B2 | 11/2003 | Brushwood et al. | |
| 6,976,362 B2 * | 12/2005 | Sheppard et al. .............. | 60/780 |

(Continued)

FOREIGN PATENT DOCUMENTS

JP 59069627 A 4/1984

(Continued)

*Primary Examiner*—William H Rodríguez

(57) ABSTRACT

A gasification power plant 10 includes a compressor 32 producing a compressed air flow 36, an air separation unit 22 producing a nitrogen flow 44, a gasifier 14 producing a primary fuel flow 28 and a secondary fuel source 60 providing a secondary fuel flow 62 The plant also includes a catalytic combustor 12 combining the nitrogen flow and a combustor portion 38 of the compressed air flow to form a diluted air flow 39 and combining at least one of the primary fuel flow and secondary fuel flow and a mixer portion 78 of the diluted air flow to produce a combustible mixture 80. A catalytic element 64 of the combustor 12 separately receives the combustible mixture and a backside cooling portion 84 of the diluted air flow and allows the mixture and the heated flow to produce a hot combustion gas 46 provided to a turbine 48. When fueled with the secondary fuel flow, nitrogen is not combined with the combustor portion.

20 Claims, 13 Drawing Sheets

U.S. PATENT DOCUMENTS

| | | |
|---|---|---|
| 7,137,257 B2 * | 11/2006 | Drnevich et al. .............. 60/775 |
| 2001/0037641 A1 | 11/2001 | Hannemann et al. |
| 2002/0144508 A1 | 10/2002 | Arar et al. |
| 2005/0076647 A1 | 4/2005 | Farhangl et al. |
| 2007/0095046 A1 * | 5/2007 | Wallace ..................... 60/39.12 |

FOREIGN PATENT DOCUMENTS

| JP | 11264542 A | 9/1999 |
|---|---|---|

* cited by examiner

| Catalytic Combustor Configuration | Fuel Type | Fuel To | Nitrogen To | Air Split % | Max Tube Temperature °C (°F) | Product Gas Temperature °C (°F) | Pressure Drop kPa (psi) |
|---|---|---|---|---|---|---|---|
| Configured for Combining Nitrogen w/ Casing Air | Natural Gas | Catalytically Active Flow Path | N/A | 15.4 | 793 (1459) | 548 (1018) | 55 (8.0) |
| Configured for Combining Nitrogen w/ Casing Air | Syngas | Catalytically Active Flow Path | Casing Air | 5.3 | 402 (755) | 324 (615) | 49 (7.1) |
| Configured for Combining Nitrogen w/ Backside Cooling Flow | Natural Gas | Catalytically Active Flow Path | N/A | 15.4 | 793 (1459) | 548 (1018) | 55 (8.0) |
| Configured for Combining Nitrogen w/ Backside Cooling Flow | Syngas | Catalytically Active Flow Path | Backside Cooling Flow Path | 7.2 | 448 (838) | 343 (650) | 50 (7.2) |
| Configured for Combining Nitrogen w/ Backside Cooling Flow and Combustible Mixture | Natural Gas | Catalytically Active Flow Path | N/A | 15.4 | 793 (1459) | 548 (1018) | 55 (8.0) |
| Configured for Combining Nitrogen w/ Backside Cooling Flow and Combustible Mixture | Syngas | 75%-Catalytically Active Flow Path 25%-Backside Cooling Flow Path | Backside Cooling Flow Path | 12.2 | 580 (1076) | 401 (753) | 51 (7.4) |

| | | | | | | |
|---|---|---|---|---|---|---|
| Configured for Bypassing a Portion of the Fuel Around Catalytic Element | Natural Gas | Catalytically Active Flow Path | N/A | 15.4 | 793 (1459) | 548 (1018) | 55 (8.0) |
| Configured for Bypassing a Portion of the Fuel Around Catalytic Element | Syngas | 35%-Catalytically Active Flow Path 20%-Backside Cooling Flow Path 45%-Bypass | Backside Cooling Flow Path | 18.8 | 796 (1464) | 513 (955) | 48 (7.0) |
| Configured for Premixing Fuel/Air w/ Eductor Boost | Natural Gas | Catalytically Active Flow Path | N/A | 15.4 | 793 (1459) | 548 (1018) | 55 (8.0) |
| Configured for Premixing Fuel/Air w/ +34 kPa (5 psi) Boost | Syngas | Catalytically Active Flow Path | Backside Cooling Flow Path | 13.5 | 592 (1097) | 411 (771) | 48 (6.9) |
| Configured for Premixing Fuel/Air w/ +69 kPa (10 psi) Boost | Syngas | Catalytically Active Flow Path | Backside Cooling Flow Path | 18.4 | 692 (1277) | 461 (861) | 46 (6.6) |
| Configured for Premixing Fuel/Air and for Selectively Throttling Fuel Mixer Air Inlet | Natural Gas | Catalytically Active Flow Path | Backside Cooling Flow Path | 15.4 | 783 (1442) | 542 (1008) | 57 (8.2) |
| Configured for Premixing Fuel/Air and for Selectively Throttling Fuel Mixer Air Inlet | Syngas | Catalytically Active Flow Path | Backside Cooling Flow Path | 23.1 | 780 (1436) | 501 (933) | 45 (6.5) |

FIG. 5B

| Catalytic Combustor Configuration | Fuel Type | Fuel To | Nitrogen To | Air Split % | Max Tube Temperature °C (°F) | Product Gas Temperature °C (°F) | Pressure Drop kPa (psi) |
|---|---|---|---|---|---|---|---|
| Configured for Combining Nitrogen w/ Casing Air | Natural Gas | Catalytically Active Flow Path | N/A | 15.4 | 793 (1459) | 548 (1018) | 55 (8.0) |
| Configured for Combining Nitrogen w/ Casing Air | Syngas | Catalytically Active Flow Path | Casing Air | 5.0 | 531 (987) | 446 (835) | 62 (9.0) |
| Configured for Combining Nitrogen w/ Backside Cooling Flow | Natural Gas | Catalytically Active Flow Path | N/A | 15.4 | 793 (1459) | 548 (1018) | 55 (8.0) |
| Configured for Combining Nitrogen w/ Backside Cooling Flow | Syngas | Catalytically Active Flow Path | Backside Cooling Flow Path | 6.8 | 577 (1071) | 466 (871) | 63 (9.1) |
| Configured for Combining Nitrogen w/ Backside Cooling Flow and Combustible Mixture | Natural Gas | Catalytically Active Flow Path | N/A | 15.4 | 793 (1459) | 548 (1018) | 55 (8.0) |
| Configured for Combining Nitrogen w/ Backside Cooling Flow and Combustible Mixture | Syngas | 75%-Catalytically Active Flow Path 25%-Backside Cooling Flow Path | Backside Cooling Flow Path | 12.1 | 721 (1329) | 530 (986) | 66 (9.5) |
| Configured for Bypassing a Portion of the Fuel Around Catalytic Element | Natural Gas | Catalytically Active Flow Path | N/A | 15.4 | 793 (1459) | 548 (1018) | 55 (8.0) |

FIG. 6A

| Configuration | Fuel | Flow Path | | | | |
|---|---|---|---|---|---|---|
| Configured for Bypassing a Portion of the Fuel Around Catalytic Element | Syngas | 60%—Catalytically Active Flow Path 25%—Backside Cooling Flow Path 15%—Bypass | 14.7 | 795 (1463) | 567 (1053) | 64 (9.3) |
| Configured for Premixing Fuel/Air w/ Eductor Boost | Natural Gas | Catalytically Active Flow Path | 15.4 | 793 (1459) | 548 (1018) | 55 (8.0) |
| | | N/A | | | | |
| Configured for Premixing Fuel/Air w/ +34 kPa (5 psi) Boost | Syngas | Catalytically Active Flow Path Backside Cooling Flow Path | 12.1 | 705 (1301) | 526 (979) | 61 (8.8) |
| Configured for Premixing Fuel/Air w/ +52 kPa (7.5 psi) Boost | Syngas | Catalytically Active Flow Path Backside Cooling Flow Path | 14.4 | 753 (1388) | 551 (1024) | 59 (8.6) |
| Configured for Premixing Fuel/Air w/ +69 kPa (10 psi) Boost | Syngas | Catalytically Active Flow Path Backside Cooling Flow Path | 16.4 | 796 (1465) | 573 (1064) | 59 (8.5) |
| Configured for Premixing Fuel/Air and for Selectively Throttling Fuel Mixer Air Inlet | Natural Gas | Catalytically Active Flow Path Backside Cooling Flow Path | 15.0 | 786 (1446) | 544 (1012) | 57 (8.2) |
| Configured for Premixing Fuel/Air and for Selectively Throttling Fuel Mixer Air Inlet | Syngas | Catalytically Active Flow Path Backside Cooling Flow Path | 15.9 | 786 (1446) | 568 (1054) | 59 (8.5) |

FIG. 6B

| Catalytic Combustor Configuration | Fuel Type | Fuel To | Nitrogen To | Air Split % | Max Tube Temperature °C (°F) | Product Gas Temperature °C (°F) | Pressure Drop kPa (psi) |
|---|---|---|---|---|---|---|---|
| Configured for Combining Nitrogen w/ Casing Air | Natural Gas | Catalytically Active Flow Path | N/A | 15.4 | 793 (1459) | 548 (1018) | 55 (8.0) |
| Configured for Combining Nitrogen w/ Casing Air | Syngas | Catalytically Active Flow Path | Casing Air | 4.9 | 523 (974) | 439 (823) | 61 (8.9) |
| Configured for Combining Nitrogen w/ Backside Cooling Flow | Natural Gas | Catalytically Active Flow Path | N/A | 15.4 | 793 (1459) | 548 (1018) | 55 (8.0) |
| Configured for Combining Nitrogen w/ Backside Cooling Flow | Syngas | Catalytically Active Flow Path | Backside Cooling Flow Path | 6.6 | 568 (1055) | 459 (859) | 62 (9.0) |
| Configured for Combining Nitrogen w/ Backside Cooling Flow and Combustible Mixture | Natural Gas | Catalytically Active Flow Path | N/A | 15.4 | 793 (1459) | 548 (1018) | 55 (8.0) |
| Configured for Combining Nitrogen w/ Backside Cooling Flow and Combustible Mixture | Syngas | 75%-Catalytically Active Flow Path 25%-Backside Cooling Flow Path | Backside Cooling Flow Path | 12.0 | 713 (1315) | 523 (974) | 65 (9.4) |
| Configured for Bypassing a Portion of the Fuel Around Catalytic Element | Natural Gas | Catalytically Active Flow Path | N/A | 15.4 | 793 (1459) | 548 (1018) | 55 (8.0) |

FIG. 7A

| Configuration | Fuel | 60%-Catalytically Active Flow Path 25%-Backside Cooling Flow Path 15%-Bypass | Backside Cooling Flow Path | | | |
|---|---|---|---|---|---|---|
| Configured for Bypassing a Portion of the Fuel Around Catalytic Element | Syngas | | N/A | 14.6 | 789 (1452) | 561 (1042) | 63 (9.2) |
| Configured for Premixing Fuel/Air w/ Eductor Boost | Natural Gas | Catalytically Active Flow Path | N/A | 15.4 | 793 (1459) | 548 (1018) | 55 (8.0) |
| Configured for Premixing Fuel/Air w/ +34 kPa (5 psi) Boost | Syngas | Catalytically Active Flow Path | N/A | 12.0 | 698 (1288) | 519 (967) | 60 (8.7) |
| Configured for Premixing Fuel/Air w/ +52 kPa (7.5 psi) Boost | Syngas | Catalytically Active Flow Path | N/A | 14.3 | 747 (1376) | 545 (1013) | 59 (8.5) |
| Configured for Premixing Fuel/Air w/ +69 kPa (10 psi) Boost | Syngas | Catalytically Active Flow Path | N/A | 16.3 | 789 (1453) | 567 (1052) | 58 (8.4) |
| Configured for Premixing Fuel/Air and for Selectively Throttling Fuel Mixer Air Inlet | Natural Gas | Catalytically Active Flow Path | Backside Cooling Flow Path | 15.0 | 787 (1448) | 545 (1013) | 56 (8.1) |
| Configured for Premixing Fuel/Air and for Selectively Throttling Fuel Mixer Air Inlet | Syngas | Catalytically Active Flow Path | Backside Cooling Flow Path | 16.3 | 788 (1451) | 566 (1051) | 57 (8.3) |

FIG. 7B

| Catalytic Combustor Configuration | Fuel Type | Fuel To | Nitrogen To | Air Split % | Max Tube Temperature °C (°F) | Product Gas Temperature °C (°F) | Pressure Drop kPa (psi) |
|---|---|---|---|---|---|---|---|
| Configured for Combining Nitrogen w/ Casing Air | Natural Gas | Catalytically Active Flow Path | N/A | 15.4 | 793 (1459) | 548 (1018) | 55 (8.0) |
| Configured for Combining Nitrogen w/ Casing Air | Syngas | Catalytically Active Flow Path | Casing Air | <0 | 410 (770) | 366 (691) | ? |
| Configured for Combining Nitrogen w/ Backside Cooling Flow | Natural Gas | Catalytically Active Flow Path | N/A | 15.4 | 793 (1459) | 548 (1018) | 55 (8.0) |
| Configured for Combining Nitrogen w/ Backside Cooling Flow | Syngas | Catalytically Active Flow Path | Backside Cooling Flow Path | <0 | 410 (770) | 366 (691) | ? |
| Configured for Combining Nitrogen w/ Backside Cooling Flow and Combustible Mixture | Natural Gas | Catalytically Active Flow Path | N/A | 15.4 | 793 (1459) | 548 (1018) | 55 (8.0) |
| Configured for Combining Nitrogen w/ Backside Cooling Flow and Combustible Mixture | Syngas | 75%–Catalytically Active Flow Path 25%–Backside Cooling Flow Path | Backside Cooling Flow Path | 0 | 407 (765) | 366 (691) | 57 (8.3) |

FIG. 8A

| | | | | | |
|---|---|---|---|---|---|
| Configured for Bypassing a Portion of the Fuel Around Catalytic Element | Natural Gas | Catalytically Active Flow Path | N/A | 15.4 | 793 (1459) | 548 (1018) | 55 (8.0) |
| Configured for Bypassing a Portion of the Fuel Around Catalytic Element | Syngas | 35%–Catalytically Active Flow Path 25%–Backside Cooling Flow Path 40%–Bypass | Backside Cooling Flow Path | 14.9 | 756 (1393) | 516 (961) | 52 (7.5) |
| Configured for Premixing Fuel/Air w/ Eductor Boost | Natural Gas | Catalytically Active Flow Path | N/A | 15.4 | 793 (1459) | 548 (1018) | 55 (8.0) |
| Configured for Premixing Fuel/Air w/ +69 kPa (10 psi) Boost | Syngas | Catalytically Active Flow Path | Backside Cooling Flow Path | 3.5 | 458 (857) | 401 (753) | 48 (7.0) |
| Configured for Premixing Fuel/Air w/ +138 kPa (20 psi) Boost | Syngas | Catalytically Active Flow Path | Backside Cooling Flow Path | 12.5 | 653 (1207) | 484 (904) | 46 (6.7) |
| Configured for Premixing Fuel/Air w/ +207 kPa (30 psi) Boost | Syngas | Catalytically Active Flow Path | Backside Cooling Flow Path | 19.2 | 771 (1420) | 543 (1010) | 44 (6.4) |

FIG. 8B

| Configuration | Fuel | | | | | | |
|---|---|---|---|---|---|---|---|
| Configured for Premixing Fuel/Air w/ Eductor Boost | Natural Gas | Catalytically Active Flow Path | N/A | 15.4 | 793 (1459) | 548 (1018) | 55 (8.0) |
| Configured for Premixing Fuel/Air w/ +69 kPa (10 psi) Boost | Syngas | Catalytically Active Flow Path | Backside Cooling Flow Path | 13.5 | 688 (1271) | 497 (926) | 53 (7.7) |
| Configured for Premixing Fuel/Air w/ +103 kPa (15 psi) Boost | Syngas | Catalytically Active Flow Path | Backside Cooling Flow Path | 18.0 | 771 (1419) | 537 (998) | 52 (7.5) |
| Configured for Premixing Fuel/Air and for Selectively Throttling Fuel Mixer Air Inlet | Natural Gas | Catalytically Active Flow Path | Backside Cooling Flow Path | 15.4 | 788 (1451) | 545 (1013) | 56 (8.1) |
| Configured for Premixing Fuel/Air and for Selectively Throttling Fuel Mixer Air Inlet | Syngas | Catalytically Active Flow Path | Backside Cooling Flow Path | 18.2 | 769 (1416) | 536 (997) | 52 (7.5) |

FIG. 8C

CATALYTIC COMBUSTOR FOR INTEGRATED GASIFICATION COMBINED CYCLE POWER PLANT

This invention was made with U.S. Government support through Government Contract Number DE-FC26-03NT41891 awarded by the Department of Energy, and, in accordance with the terms set forth in said contract, the U.S. Government may have certain rights in the invention.

FIELD OF THE INVENTION

This invention relates generally to gas turbines, and more particularly, to a catalytic combustor for an integrated gasification combined cycle (IGCC) power plant capable of using multiple fuel types.

BACKGROUND OF THE INVENTION

Catalytic combustion systems are well known in gas turbine applications to reduce the creation of pollutants, such as NOx, in the combustion process. One catalytic combustion technique known as the rich catalytic, lean burn (RCL) combustion process includes mixing fuel with a first portion of compressed air to form a rich fuel mixture. The rich fuel mixture is passed over a catalytic surface and partially oxidized, or combusted, by catalytic action, increasing mixture temperature. Activation of the catalytic surface is first achieved when the temperature of the rich fuel mixture is elevated to a temperature at which the catalytic surface becomes active. Typically, compression raises the temperature of the air mixed with the fuel to form a rich fuel mixture having a temperature sufficiently high to activate the catalytic surface. After passing over the catalytic surface, the resulting partially oxidized hot rich fuel mixture is then mixed with a second portion of compressed air in a downstream combustion zone to produce a heated lean combustion mixture for completing the combustion process. Catalytic combustion reactions may produce less NOx and other pollutants, such as carbon monoxide and hydrocarbons, than pollutants produced by homogenous combustion.

U.S. Pat. No. 6,174,159 describes a catalytic combustion method and apparatus for a gas turbine utilizing a backside cooled design. Multiple cooling conduits, such as tubes, are coated on the outside diameter with a catalytic material and are supported in a catalytic reactor. A first portion of a fuel/air mixture, such as 15% by volume of the fuel/air mixture, is passed over the catalyst coated cooling conduits and is catalytically combusted, while simultaneously, a second portion of the fuel/air, such as 85% by volume of the fuel/air mixture, enters the multiple cooling conduits and cools the catalyst. The exothermally catalyzed fluid then exits the catalytic combustion zone and is mixed with the cooling fluid in a downstream post catalytic combustion zone defined by a combustor liner, creating a heated, combustible mixture.

Integrated gasification combined cycle (IGCC) power plants are known to produce synthesis gas, or syngas, from carbon-containing sources such as coal, Biomass and other sources. The syngas is then used to fuel, using a conventional diffusion flame process, a combustor of a gas turbine engine connected to a generator for producing electrical power. In IGCC power plants, the gas turbine is typically required to be capable of being operated on a back-up fuel source, such as natural gas, for example, during startup and periods when syngas is unavailable.

In a conventional IGCC process, an air separation unit (ASU) is used to provide oxygen for a gasifier in a separation process that also produces compressed nitrogen as a byproduct. Typically, the nitrogen produced during the separation process is returned to the combustor. In conventional diffusion flame combustors used in an IGCC power plant, the syngas needs to be diluted to reduce a peak syngas flame temperature to achieve acceptable NOx emissions. Dilution is typically achieved with the injection of ASU produced nitrogen into the syngas provided to the combustor. In addition, injection of nitrogen into the syngas may be needed to satisfy the turbine compressor and expander mass flow requirements.

BRIEF DESCRIPTION OF THE DRAWINGS

The invention will be more apparent from the following description in view of the drawings that show:

FIG. 5 shows a table including performance calculations of exemplary embodiments of the catalytic combustor for the IGCC plant of FIG. 1 using a cold gas cleaning IGCC process with syngas reheat to 114° Fahrenheit.

FIG. 6 shows a table including performance calculations of exemplary embodiments of the catalytic combustor for the IGCC plant of FIG. 1 using a cold gas cleaning IGCC process with syngas reheat to 580° Fahrenheit, nitrogen dilution, no humidification, and 0% integration.

FIG. 7 shows a table including performance calculations of exemplary embodiments of the catalytic combustor for the IGCC plant of FIG. 1 using a cold gas cleaning IGCC process with syngas reheat to 580° Fahrenheit, nitrogen dilution, no humidification, and 100% integration.

FIG. 8 shows a table including performance calculations of exemplary embodiments of the catalytic combustor for the IGCC plant of FIG. 1 using a hot gas cleaning IGCC process with syngas heated to 942° Fahrenheit.

DETAILED DESCRIPTION OF THE INVENTION

It is typically desired to start up a gas turbine of an IGCC plant using a secondary fuel, such as natural gas, and continue fueling the gas turbine with natural gas through at least a portion of a load ramp profile, up to base load operation (such as up to 50% base load). Syngas produced by the plant is then used as the primary fuel during base load operation. Natural gas may also be used as a back up fuel during gasifier plant outages. While catalytic-type combustors are being developed to be used in conventional gas turbine power plants to achieve reduced pollutant emission levels, the tightly controlled volumetric flows needed to support catalytic combustion has limited their development in applications requiring operation with fuels having different British Thermal Unit (BTU) ratings. Because of the comparatively large surface area required for catalytic combustion, pressure drop through the combustion system is an important design consideration. For example, by using a lower BTU fuel, a total flow rate of fuel through a catalytic portion of a catalytic combustor needs to be increased significantly compared to using a higher BTU fuel, resulting in an unacceptable pressure drop through the catalytic portion of the catalytic combustor catalyst. Another area of concern when using a low BTU fuel is the fuel injection system of the combustor. Significant changes in the fuel flow rates may require a change in the fuel injection system to obtain an optimized fuel air mixture at the catalyst section of the combustor. Inadequate fuel mixing may result in a decrease in catalytic reaction performance and may result in overheating. The inventors have innovatively developed a catalytic combustor for IGCC plants that is capable of operating efficiently using fuels having different BTU ratings, while keeping pollutant emission, such as NOx emissions, within acceptable levels.

Figure 1:
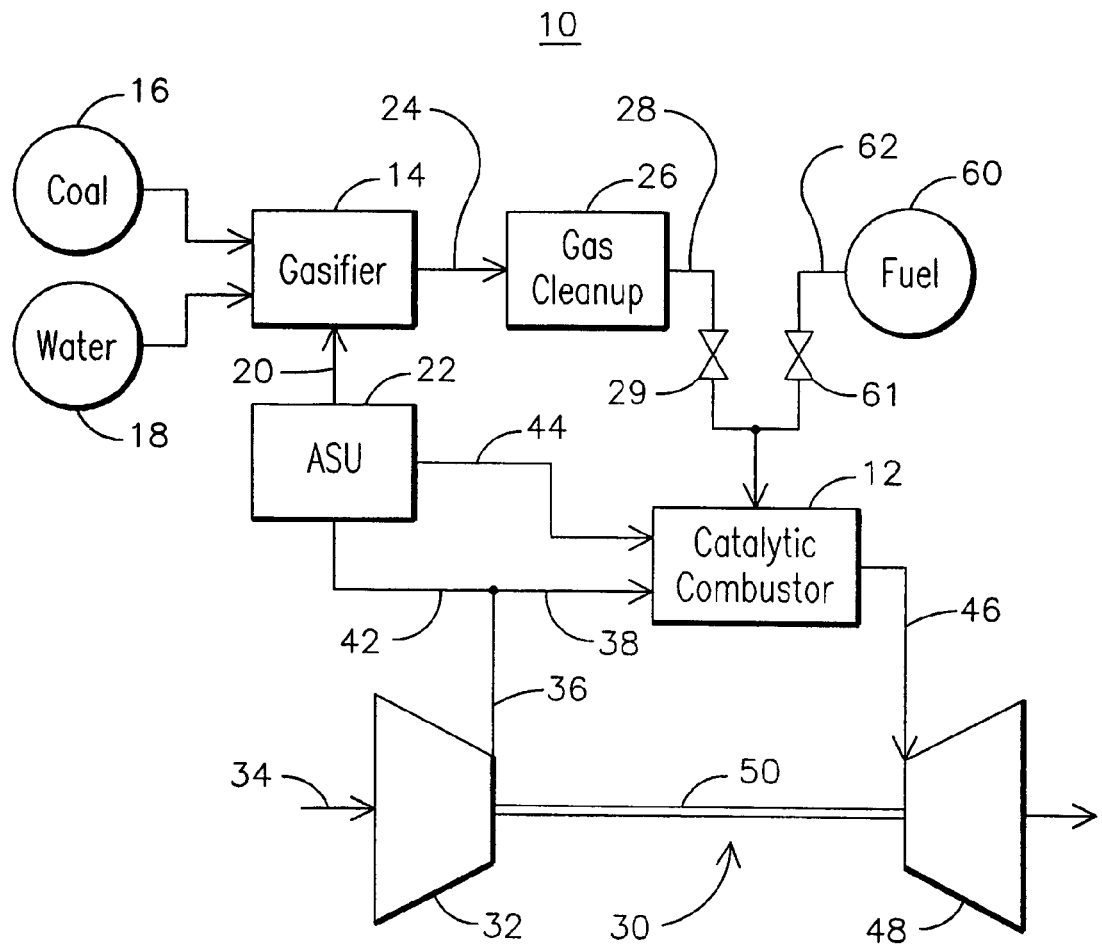
FIG. 1 illustrates a schematic diagram of an IGCC plant including an improved catalytic combustor capable of being operated using fuels having different BTU ratings.

FIG. 1 illustrates a schematic diagram of an IGCC plant 10 including an improved catalytic combustor 12 capable of being operated using fuels having different BTU ratings. The plant 10 includes a gasifier 14 fed by a carbonaceous fuel source, such as coal 16, and water 18. The gasifier 14 also receives an oxygen flow 20 from an air separation unit (ASU) 22 and generates a raw gas flow 24 provided to a gas cleanup system 26. The raw gas 24 is cleansed in the gas cleanup system 26 using, for example, a cold gas process, a cold gas with syngas reheat process, or hot gas cleanup process, to produce clean syngas fuel flow 28 provided to a gas turbine engine 30 as a primary fuel. Valve 29 may be used to control the syngas fuel flow 28 provided to the gas turbine engine 30. The gas turbine engine 30 includes a compressor 32 for receiving a filtered ambient air flow 34 and for producing a compressed air flow 36. The compressed air flow 36 may be separated into a combustor portion 38 of the compressed air flow 36 for introduction into the catalytic combustor 12 and an ASU portion 42 of the compressed air flow for introduction into the ASU 22. In addition to generating oxygen flow 20 for the gasifier 14, the ASU generates a nitrogen flow 44 for introduction into the catalytic combustor 12.

The nitrogen flow 44, syngas fuel flow 28, and combustor portion 38 of the compressed air flow 36 may be combined and combusted within the catalytic combustor 12 to produce a hot combustion gas 46. A turbine 48 receives the hot combustion gas 46, where it is expanded to extract mechanical shaft power. In one embodiment, a common shaft 50 interconnects the turbine 48 with the compressor 12 as well as an electrical generator (not shown) to provide mechanical power for compressing the ambient air 14 and for producing electrical power, respectively. An expanded combustion gas 52 may be exhausted directly to the atmosphere, or it may be routed through additional heat recovery systems (not shown). In an aspect of the invention, an alternate fuel flow 62, such as natural gas, may be provided to the gas turbine engine 30 from fuel source 60. For example, the alternate fuel flow 62 may be provided to fuel the catalytic combustor 12 of the gas turbine engine 30 instead of syngas, such as during start up of the IGCC, and during other times when syngas fuel flow 28 is not available. Valve 61 may be used to control the flow of alternate fuel flow 62 provided to the gas turbine engine 30.

Figure 2:
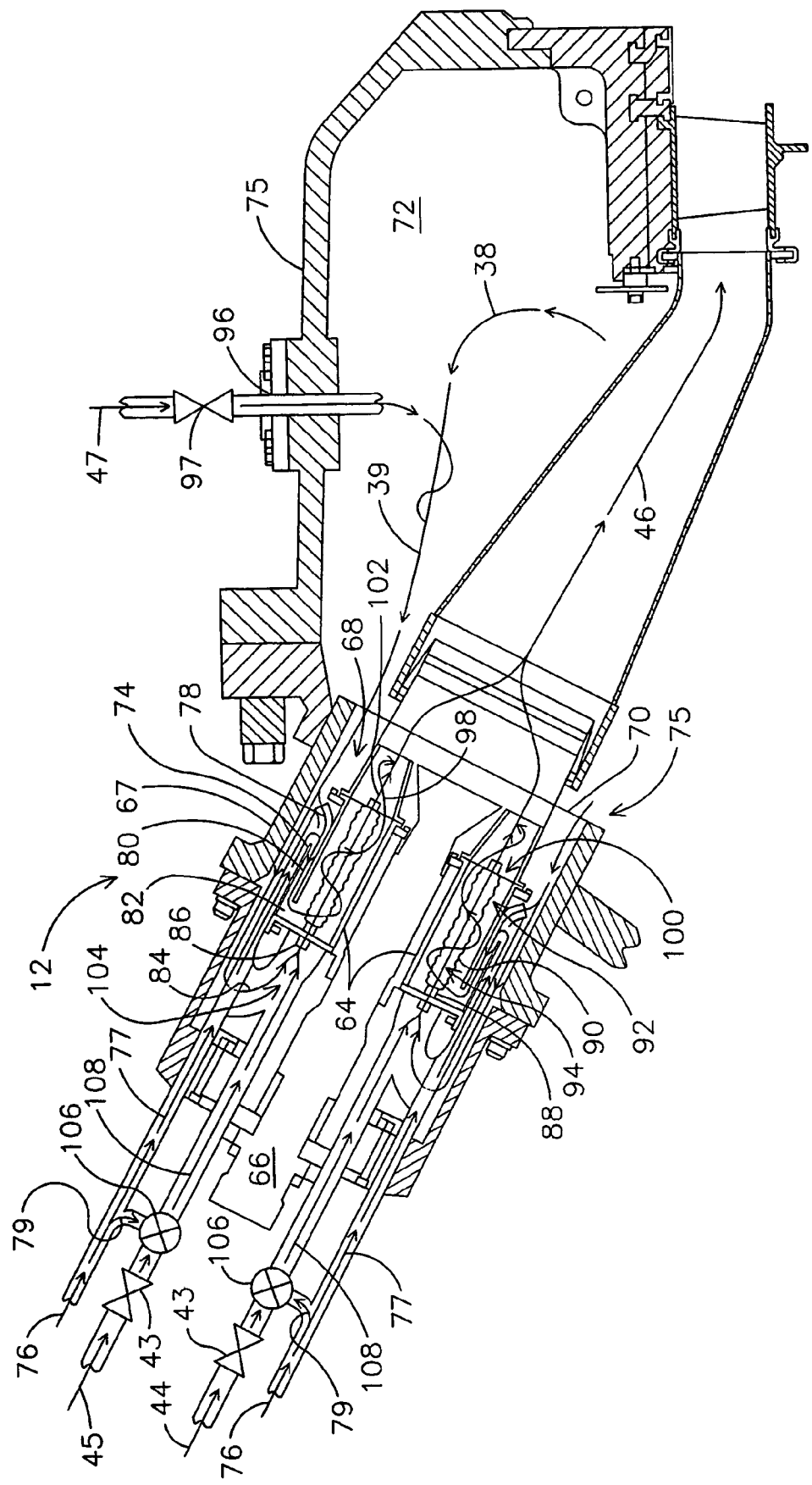
FIG. 2 shows a cross-sectional view taken along a flow direction of an exemplary embodiment of a catalytic combustor for the IGCC plant of FIG. 1.

The gas turbine engine 30 provides improved operating flexibility for the IGCC plant as a result of the features of the catalytic combustor 12 that are shown more clearly in FIGS. 2-5. FIG. 2 shows a cross-sectional view of an exemplary embodiment of a catalytic combustor 12 for an IGCC plant 10 capable of combusting at least two types of fuel having different BTU ratings. For example, a primary fuel, such as syngas may be used when available, and an alternate fuel flow, such as natural gas, may be used when the primary fuel is unavailable. The catalytic combustor 12 includes a plurality of catalytic elements 64 spaced apart annularly around a central region 66. The plurality of catalytic elements 64 may be disposed within a cylindrical can 67 spaced radially outward from the elements 64 to form an annular flow path 68 around the elements 64. The annular flow path 68 includes an annular inlet 70 in fluid communication with a chamber 72 defined by a casing 73 disposed around a downstream end 75 of the catalytic combustor. The annular flow path 68 may receive a combustor portion 38 of the compressed air from the chamber 72 via the annular inlet 70. A fuel/air mixer 74 combines a fuel flow 76, such as at least one of the primary fuel flow and secondary fuel flow, with a mixer portion 78 of the combustor portion 38 to produce a combustible mixture 80. The combustible mixture 80 is provided to the catalytic element 64 via a combustion mixture inlet 82. A backside cooling portion 84 of the combustor portion 38 may also be provided to the catalytic element 64 via a backside cooling inlet 86.

Inside the catalytic element 64, the combustible mixture 80 and the backside cooling portion 84 are separated, for at least a portion of a travel length through the element 64 by a pressure boundary element 88 to form a catalytically active flow path 92 and a backside cooling flow path 94. In an aspect of the invention, the pressure boundary element 88 is coated with a catalyst 90 on a side exposed to the combustible mixture 80. The catalyst 90 may have as an active ingredient of precious metals, Group VIII noble metals, base metals, metal oxides, or any combination thereof. Elements such as zirconium, vanadium, chromium, manganese, copper, platinum, palladium, osmium, iridium, rhodium, cerium, lanthanum, other elements of the lanthanide series, cobalt, nickel, iron, and the like may be used.

In a backside cooling embodiment, an opposite side of the pressure boundary element 88 confines the backside cooling portion 84 for at least a portion of the travel length. While exposed to the catalyst 90, the combustible mixture 80 is oxidized in an exothermic reaction, and the catalyst 90 and the pressure boundary element 88 are cooled by the un-reacted backside cooling portion 84, thereby absorbing a portion of the heat produced by the exothermic catalytic reaction.

In an aspect of the invention, the pressure boundary element 88 may include a tube for containing a fluid flow. The tube may be coated on its outside diameter surface with a catalyst 90 to be exposed to the combustible mixture 80 traveling around the exterior of the tube. In a backside cooling arrangement, the backside cooling portion 84 is directed to travel through the interior of the tube. Alternatively, the tube may be coated on the interior with a catalyst 90 to expose a combustible mixture 80 traveling through the interior of the tube, while the backside cooling portion 84 travels around the exterior of the tube. An array of such tubes may be arranged within the catalytic element 64. Other methods may be used to expose the combustion mixture combustible mixture 80 to the catalyst 90, such as constructing a structure to suspend the catalyst in the combustible mixture 80, constructing a structure from a catalytic material to suspend in the combustible mixture 80, or providing pellets coated with a catalyst material exposed to the combustible mixture 80. While the above described catalytic combustor may be used to efficiently combust a high BTU fuel such as natural gas, such a design may not meet a low emissions requirement and/or flame stability requirement when using a low BTU fuel, such as syngas available in an IGCC plant, for example, because of different volumetric flow requirements of a low BTU fuel.

In an embodiment of the invention, a casing portion 47 of the nitrogen flow 44 produced by the ASU 22 may be mixed with the combustor portion 38 of the compressed air flow prior to being mixed with a fuel 76, such as syngas fuel produced by the gasifier 14. For example, the casing portion 47 of the nitrogen flow 44 may be mixed with the combustor portion 38 prior to being introduced into the annular inlet 70, such as by injecting the casing portion 47 into the chamber 72 via nitrogen inlet 96. The casing portion 47 of the nitrogen flow 44 is allowed to combine with the combustor portion 38 within the chamber 72 to form a diluted air flow 39 directed into the annular flow path 68 from the chamber 72. The fuel/air mixer 74 receives the mixer portion 78 of the diluted air flow 39 and the fuel flow 76 to produce the combustible mixture 80 directed into the catalytically active flow path 92. The combustible mixture 80 is catalytically combusted to generate a partially combusted mixture 98 discharged from an outlet end 100 of the catalytic element 64. The backside cooling portion 84 of the diluted air flow 39 is introduced into the backside cooling flow path 94 and is discharged as a heated flow 102 from outlet end 100. The partially combusted mixture 98 and the heated flow 102 combine downstream of the catalytic element to produce a hot combustion gas 46.

In an aspect of the invention, a nitrogen injection valve 97 may be provided to selectively control the casing portion 47 of the nitrogen flow 44 entering the chamber 72. Other nitrogen valves 43, controlling a backside portion 45 of the nitrogen flow 44 delivered to the backside cooling flow path 94 may be closed when providing the casing portion 47 to the chamber 72. In a further aspect, the flow paths in the catalytic combustor 12 may be sized and arranged to accommodate a volumetric flow needed to support catalytic combustion of a higher BTU fuel, such as natural gas. During natural gas operation, nitrogen, typically unavailable during natural gas operation, is not introduced into the chamber 72. Injection of nitrogen into the combustor portion 38 allows operating the catalytic combustor 12 with a lower BTU fuel, such as syngas.

In another embodiment, the backside portion 45 of the nitrogen flow 44 may be delivered to the backside cooling flow path 94, for example, instead of being delivered to the chamber 72. Nitrogen flow to the chamber 72 may be limited by closing valve 97 when operating in this mode. The annular flow path 68 may receive a combustor portion 38 of the compressed air from the chamber 72 via the annular inlet 70. The fuel/air mixer 74 combines the fuel flow 76, such as syngas, with a mixer portion 78 of the combustor portion 38 to produce the combustible mixture 80 provided, via the combustion mixture inlet 82, to the catalytically active flow path 92 of the catalytic element 64. The combustible mixture 80 is catalytically combusted to produce the partially combusted mixture 98 discharged from the outlet end 100 of the catalytic element 64.

The backside cooling portion 84 of the combustor portion 38 may be directed to combine with the backside portion 45 of the nitrogen flow 44 along a backside mixing flow path 104 to produce a backside cooling portion 84 diluted with nitrogen. The backside cooling portion 84, diluted with nitrogen, is provided to the backside cooling flow path 94 of the catalytic element 64 via a backside cooling inlet 86 to produce the heated flow 102. The partially combusted mixture 98 and the heated flow 102 combining downstream of the catalytic element to produce the hot combustion gas 46. In an aspect of the invention, nitrogen valves 43 may be provided to selectively control the backside portion 45 of the nitrogen flow 44 entering the backside mixing flow path 104. When the combustor is operated with an alternate fuel, such as natural gas, valves 43 may be closed so that nitrogen is not allowed to mix with the backside cooling portion 84. In a further aspect, the flow paths in the catalytic combustor 12 may be sized and arranged to accommodate a volumetric flow needed to support catalytic combustion of a higher BTU fuel, such as natural gas. During natural gas operation, nitrogen, typically unavailable during natural gas operation, is not introduced into the backside mixing flow path 104. Injection of nitrogen into the backside cooling portion 84 allows operating the catalytic combustor 12 with a lower BTU fuel, such as syngas.

In yet another embodiment depicted in FIG. 2, the nitrogen flow 44 may be delivered to the backside cooling flow path 94 and the fuel 76, such as syngas, may be split so that a portion of the fuel 76 is delivered to the fuel/air mixer 74 and another portion of the fuel 76 is delivered to the backside cooling flow path 94. For example, a first fuel portion 77 of the fuel 76, and a mixer portion 78 of the combustor portion 38 of the compressed air flow 36 are mixed in the fuel/air mixer 74 to produce combustible mixture 80. Upstream of the backside cooling inlet 86, a second fuel portion 79 of the fuel 76 may be allowed to combine with the nitrogen flow 44 to produce a nitrogen flow 44 comprising a fuel/nitrogen mixture, or fuel/nitrogen mixture 108. For example, a fuel/nitrogen mixer 106 may be provided upstream of the backside mixing flow path 104 for combining the second fuel portion 79 with the nitrogen flow 44 to produce a fuel/nitrogen mixture 108 that is discharged into the backside mixing flow path 104. In the mixing flow path 104, the fuel/nitrogen mixture 108 is combined with the backside cooling portion 84 prior to entering the backside cooling flow path 94 of the catalytic element 64. In an aspect of the invention, the second fuel portion 79 may be combined with the backside cooling portion 84 prior to entering the backside cooling flow path 94 and then combined with the nitrogen flow 44. In another aspect, the second fuel portion 79, the backside cooling portion 84, and the nitrogen flow 44 may be simultaneously combined, for example, before entering the backside cooling flow path 94. In yet another aspect, the first fuel portion 77 may comprise about 70% to 80% by volume of the fuel 76, and the second fuel portion 79 may comprise about 20% to 30% by volume of the fuel 76.

Figure 3:
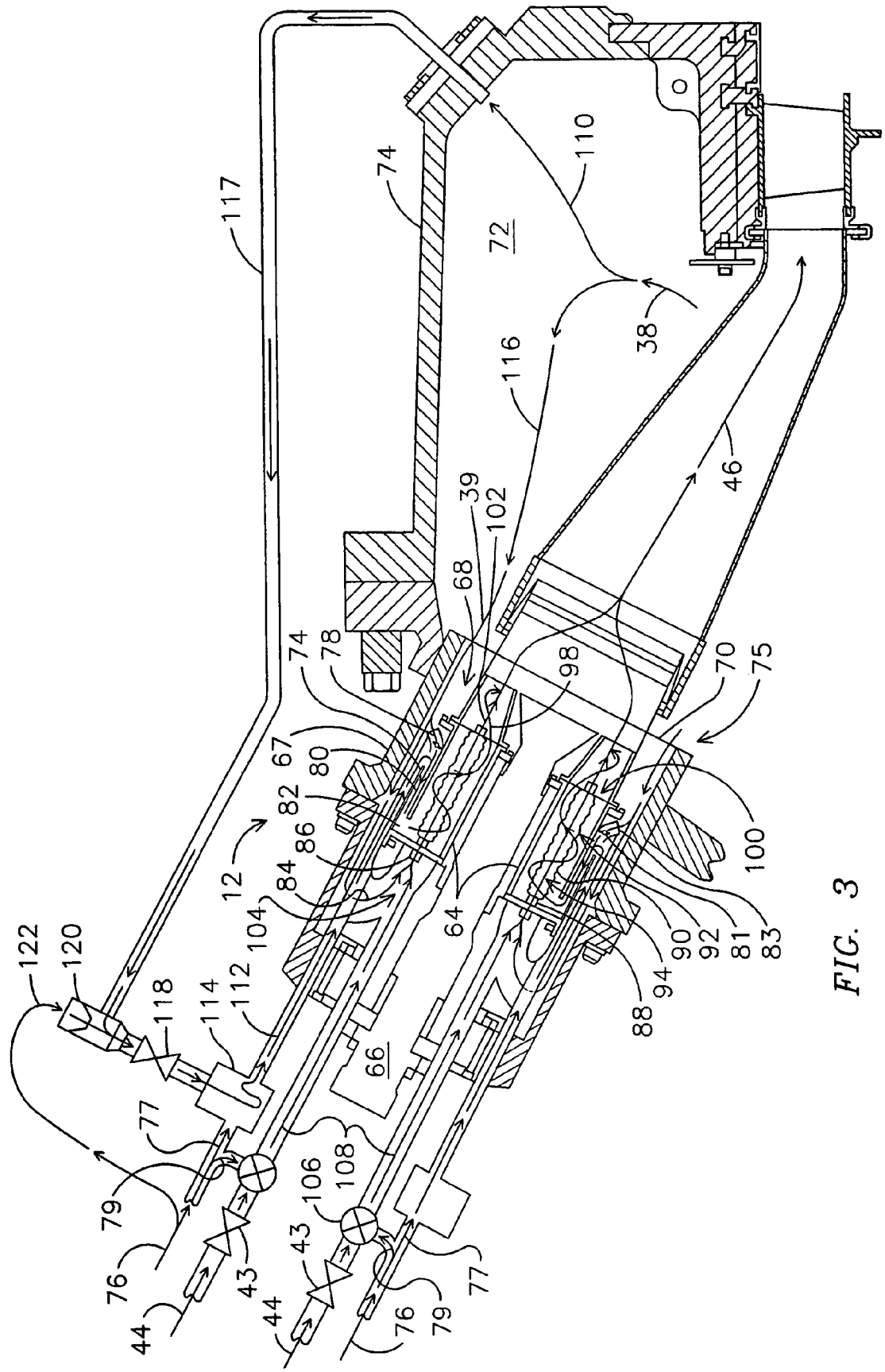
FIG. 3 shows a cross-sectional view taken along a flow direction of another exemplary embodiment of a catalytic combustor for the IGCC plant of FIG. 1.

FIG. 3 shows a sectional view of another exemplary embodiment of a catalytic combustor 12 for an IGCC plant capable of combusting at least two types of fuel having different BTU ratings. In an embodiment depicted in FIG. 3, a premixing portion 110 of the combustor portion 38 of the compressed air flow 36 may be combined with the fuel 76 upstream of the fuel/air mixer 74 to produce a premixed fuel/air mixture 112 provided to the fuel/air mixer 74. A premix fuel/air mixer 114, for example, comprising an annular manifold disposed upstream of the fuel/air mixer 74, may be used to distribute the premixing portion 110 annularly around the combustor 12 while combining with the fuel 76 introduced into the manifold 114. In an aspect of the invention, a premixing conduit 117 may conduct the premixing portion 110 from the chamber 72 to the premix fuel/air mixer 114. A premixing valve 118 may be provided to selectively control the premix portion 110 flowing into the premix fuel/air mixer 114. When the combustor 12 is operated with natural gas, the valve 118 may be closed. The premixing conduit 117 may be sized to allow sufficient volumetric flow to the catalytic combustor 12 to achieve a desired combustor operating condition.

The annular flow path 68 of the catalytic combustor 12 may receive an annular inlet portion 116 of the combustor portion 38 from the chamber 72 via the annular inlet 70. The fuel/air mixer 74 combines the premixed fuel/air mixture 112 with the mixer portion 78 of the combustor portion 38, via the combustion mixture inlet 82, to produce the combustible mixture 80 provided to the catalytically active flow path 92 of the catalytic element 64. The combustible mixture 80 is catalytically combusted to produce the partially combusted mixture 98 discharged from the outlet end 100 of the catalytic element 64. In an aspect of the invention, the flow paths of the embodiment of the catalytic combustor 12 shown in FIG. 3 may be sized and arranged to accommodate a volumetric flow needed to support catalytic combustion of a higher BTU fuel, such as natural gas. Premixing of the premixing portion 110 into the fuel 76 allows operating the catalytic combustor 12 with a lower BTU fuel, such as syngas.

In another embodiment of the invention, the flow paths in the catalytic combustor 12 may be sized and arranged to accommodate a relatively higher volumetric flow needed to support catalytic combustion of a lower BTU fuel, such as syngas, than is conventionally required to catalytically combust a higher BTU rated fuel, such as natural gas. For example, the fuel/air mixer 74, the combustion mixer inlet 82, and a throat 83 of the fuel/air mixer 74 may be sized larger than these elements would be sized for a catalytic combustor 12 fueled with natural gas. Consequently, when fueling the catalytic combustor 12 configured for such higher volumetric flows with a higher BTU fuel such as natural gas, a flow modulation element 81, such as valve or a throttle plate, movably mounted in a throat 83 of the fuel/air mixer 74, may be used to selectively control the mixer portion 78 entering the fuel/air mixer 74 to optimize the combustor 12 for natural gas operation or syngas operation. For example, when operating the combustor 12 with natural gas, the flow modulation element 81 may be positioned to partially restrict the mixer portion 78 entering the fuel/air mixer 74 to achieve a desired combustor portion 38 air split between mixer portion and the backside cooling portion 84. Alternatively, when operating the combustor 12 with syngas, the flow modulation element 81 may be positioned so as not to restrict the mixer portion 78 entering the fuel/air mixer 74 to achieve a desired combustor portion 38 air split between the mixer portion 78 and the backside cooling portion 84.

In an aspect of the invention, the fuel 76, such as the syngas, may be split prior to entering the premix fuel/air mixer 114 so that a portion of the fuel 76 is delivered to the premix fuel/air mixer 114 and another portion of the fuel is delivered to the backside cooling flow path 94. For example, a first fuel portion 77 of the fuel 76 may be provided to the premix mixer 114 to produce premixed fuel/air mixture 112. Upstream of the backside cooling inlet 86, a second fuel portion 79 of the fuel 76 may be allowed to combine with the with the nitrogen flow 44 to produce a fuel/nitrogen mixture 108. For example, a fuel/nitrogen mixer 106 may be provided upstream of the backside mixing flow path 104 for combining the second fuel portion 79 with the nitrogen flow 44 to produce the fuel/nitrogen mixture 108 that is discharged into the backside mixing flow path 104. In the mixing flow path 104, the fuel/nitrogen mixture 108 is combined with the backside cooling portion 84 prior to entering the backside cooling flow path 94 of the catalytic element 64. In another aspect of the invention, the first fuel portion 77 may comprise about 70% to 80% by volume of the fuel 76 and the second fuel portion 79 may comprise about 20% to 30% by volume of the fuel 76. Nitrogen valves 43 may be provided to selectively control the nitrogen flow 44 entering the backside mixing flow path 104. When the combustor 12 is operated with natural gas, the valves 43 may be closed.

In a further aspect of the invention, the premixing conduit 117 may comprise an eductor 120 disposed upstream of the premix fuel/air mixer 114 and receiving an eductor portion 122 of the fuel 76 to pump the premixing portion 110 flowing through the premixing conduit 117. A pressure of the eductor portion 122 provided to the eductor 120 may be controlled to achieve a desired volumetric quantity of the premixing portion 110 through the premixing conduit 117.

Figure 4:
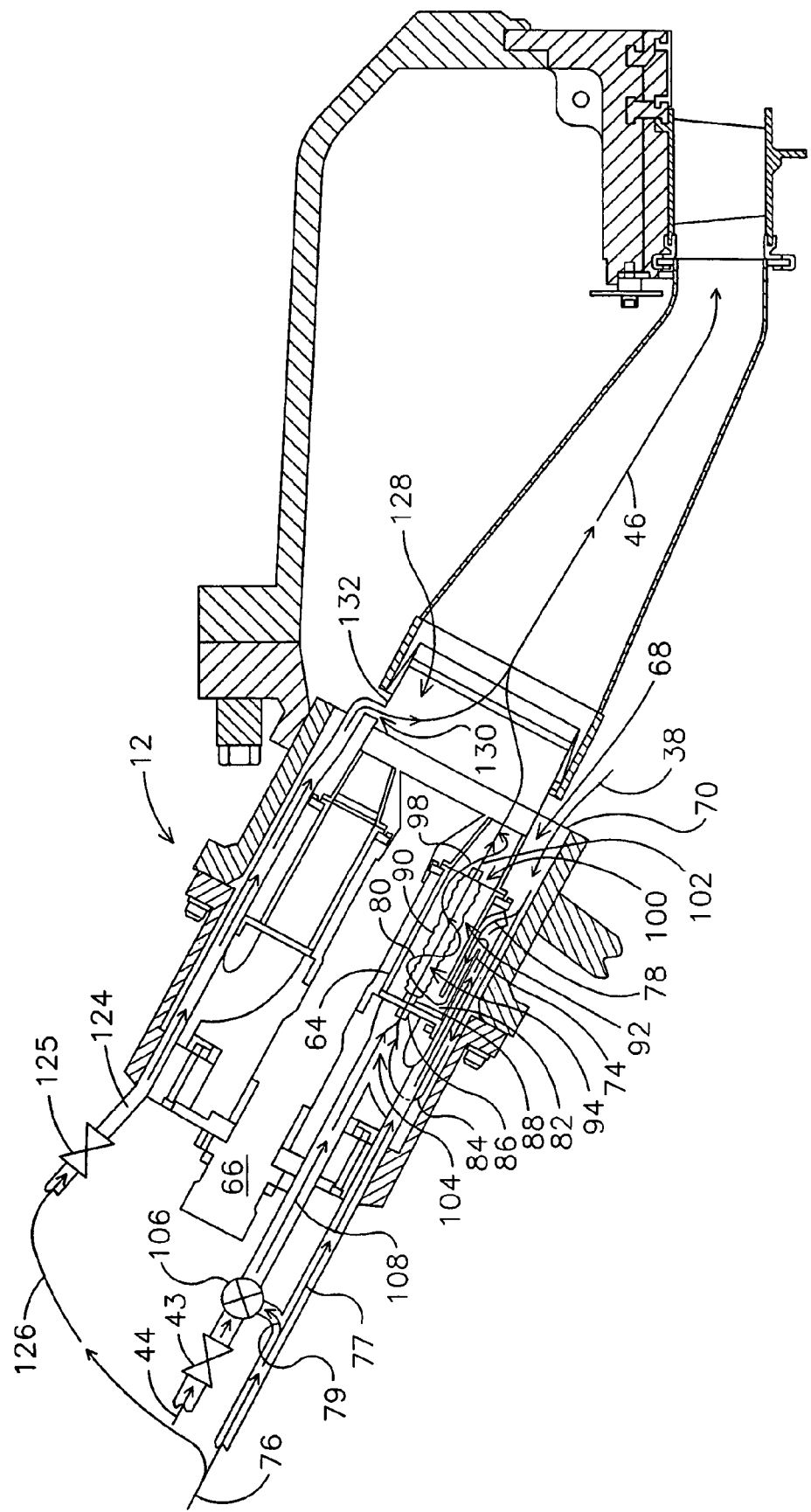
FIG. 4 shows a cross-sectional view taken along a flow direction of another exemplary embodiment of a catalytic combustor for the IGCC plant of FIG. 1.

FIG. 4 shows a sectional view of another exemplary embodiment of a catalytic combustor 12 for an IGCC plant capable of combusting at least two types of fuel having different BTU ratings. In a further aspect of the invention depicted in FIG. 4, the catalytic combustor 12 includes annular flow path 68 receiving combustor portion 38 of the compressed air via the annular inlet 70. The fuel/air mixer 74 may combine the fuel 76, such as the syngas fuel flow 28, or a first fuel portion 77 of the fuel, with a mixer portion 78 of the combustor portion 38 to produce the combustible mixture 80 provided, via the combustion mixture inlet 82, to the catalytically active flow path 92 of the catalytic element 64. The combustible mixture 80 is catalytically combusted to produce the partially combusted mixture 98 discharged from the outlet end 100 of the catalytic element 64.

Upstream of the backside cooling inlet 86, a second fuel portion 79 of the fuel 76 may be allowed to combine with the nitrogen flow 44 to produce a nitrogen flow 44 comprising a fuel/nitrogen mixture, or fuel/nitrogen mixture 108. For example, a fuel/nitrogen mixer 106 may be provided upstream of the backside mixing flow path 104 for combining the second fuel portion 79 with the nitrogen flow 44 to produce fuel/nitrogen mixture 108 that is discharged into the backside mixing flow path 104. In an aspect of the invention, nitrogen valves 43 may be provided to selectively control the nitrogen flow 44 entering the backside mixing flow path 104. In the mixing flow path 104, the fuel/nitrogen mixture 108 is combined with the backside cooling portion 84 prior to entering the backside cooling flow path 94 of the catalytic element 64. In an aspect of the invention, the second fuel portion 79 may be combined with the backside cooling portion 84 prior to entering the backside cooling flow path 94, and then combined with the nitrogen flow 44. In another aspect, the second fuel portion 79, the backside cooling portion 84, and the nitrogen flow 44 may be simultaneously combined, for example, before entering the backside cooling flow path 94. The combustible mixture 80 is catalytically combusted to generate partially combusted mixture 98 discharged from the outlet end 100 of the catalytic element 64. The backside cooling portion 84 is combined with the fuel/nitrogen mixture 108 and is introduced into the backside cooling flow path 94 and is discharged as heated flow 102 from outlet end 100.

In a further aspect of the invention, a bypass conduit 124 may be provided to conduct a bypass portion 126 of the fuel 76 around the catalytic element 64 and to discharge the bypass portion 126 downstream of the catalytic element 64 into a post catalytic combustion stage 128. The bypass conduit may discharge the bypass portion 126 into the post catalytic combustion stage 128 through an opening 130 in a combustion liner 132 defining the post catalytic combustion stage 128. In the post catalytic combustion stage 128, the bypass portion 126 may be combined with the partially combusted mixture 98 and the heated flow 102 discharged from the catalytic element 64 to produce a hot combustion gas 46.

In yet another aspect, the first fuel portion 77 comprises about 40% to 50% by volume of the fuel 76, the second fuel portion 79 comprises about 20% to 30% by volume of the fuel 76, and the bypass portion 126 comprises about 30% to 40% by volume of the fuel 76. The flow paths of the embodiment of the catalytic combustor 12 shown in FIG. 4 may be sized and arranged to accommodate a volumetric flow needed to support catalytic combustion of a higher BTU fuel, such as natural gas. Bypassing of some of the fuel around the catalytic element 64 allows operating the catalytic combustor 12 with a lower BTU fuel, such as syngas.

FIGS. 5-8 show table including performance calculations for the exemplary embodiments of the catalytic combustor for the IGCC plant of FIG. 1. FIG. 5 shows a table including performance calculations using a cold gas cleaning IGCC process with syngas reheat to 114° Fahrenheit. FIG. 6 shows a table including performance calculations using a cold gas cleaning IGCC process with syngas reheat to 580° Fahrenheit, nitrogen dilution, no humidification, and 0% integration. FIG. 7 shows a table including performance calculations using a cold gas cleaning IGCC process with syngas reheat to 580° Fahrenheit, nitrogen dilution, no humidification, and 100% integration. FIG. 8 shows a table including performance calculations using a hot gas cleaning IGCC process with syngas heated to 580° Fahrenheit.

In the each of the tables shown in FIGS. 5-8, the first column lists the "Catalytic Combustor Configuration," such as a catalytic combustor configured for combining nitrogen with casing air as described previously. The "Fuel Type" column lists the type of fuel used for the respective catalytic combustor configuration, such as syngas. The "Fuel To" column lists the element(s) of the catalytic combustor that is (are) being fueled for each respective catalytic combustor configuration. The "Nitrogen To" column lists the element(s) of the catalytic combustor that is (are) being provided nitrogen for each respective catalytic combustor configuration using syngas as a fuel. In the case of natural gas fueling, nitrogen may not be provided even though the respective combustor configuration may be capable of receiving nitrogen. The "Air Split" column lists the air split between the catalytically active flow path and the backside cooling flow path for each respective catalytic combustor configuration. The "Max Tube Temperature" column lists the maximum tube temperatures of the catalytic tubes for each respective catalytic combustor configuration. The "Product Gas Temperature" column lists the hot combustion gas temperature tubes for each respective catalytic combustor configuration. The "Pressure Drop" column lists the pressure drop from the inlet of the catalytic combustor to the outlet of the catalytic combustor for each respective catalytic combustor configuration.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A gasification power plant comprising:
a compressor receiving an ambient air flow and producing a compressed air flow;
an air separation unit receiving an air separation unit portion of the compressed air flow, and producing a nitrogen flow and an oxygen flow;
a gasifier receiving the oxygen flow, carbonaceous fuel, and water, and producing a primary fuel flow;
a fuel supply providing a secondary fuel flow;
a catalytic combustor comprising a diluent mixing flow path combining the nitrogen flow and a combustor portion of the compressed air flow to form a diluted air flow, a fuel/air mixer combining at least one of the primary fuel flow and secondary fuel flow with a mixer portion of the diluted air flow to produce a combustible mixture; a catalytic element having a catalytically active flow path receiving the combustible mixture and producing a partially combusted mixture and a backside cooling flow path receiving a backside cooling portion of the diluted air flow and producing a heated flow, the partially combusted mixture and the heated flow combining downstream of the catalytic element to produce a hot combustion gas; and
a turbine receiving the hot combustion gas and expanding the hot combustion gas to extract mechanical shaft power.

2. The gasification power plant of claim 1, wherein the diluent mixing flow path is defined by a casing disposed around a downstream end of the catalytic combustor comprising a nitrogen inlet receiving the nitrogen flow.

3. The gasification power plant of claim 1, wherein the primary fuel flow comprises syngas and the secondary fuel flow comprises natural gas.

4. A gasification power plant comprising:
a compressor receiving an ambient air flow and producing a compressed air flow;
an air separation unit receiving an air separation unit portion of the compressed air flow, and producing a nitrogen flow and an oxygen flow;
a gasifier receiving the oxygen flow, carbonaceous fuel, and water, and producing a primary fuel flow;
a fuel supply providing a secondary fuel flow;
a catalytic combustor comprising a flow path receiving a combustor portion of the compressed air flow, a fuel/air mixer combining at least one of the primary fuel flow and secondary fuel flow and a mixer portion of the combustor portion to produce a combustible mixture; a backside mixing flow path combining the nitrogen flow and a backside cooling portion of the combustor portion of the compressed air flow to produce a diluted air flow, a catalytic element having a catalytically active flow path receiving the combustible mixture and producing a partially combusted mixture and a backside cooling flow path receiving the diluted air flow and producing a heated flow, the partially combusted mixture and the heated flow combining downstream of the catalytic element to produce a hot combustion gas; and
a turbine receiving the hot combustion gas and expanding the hot combustion gas to extract mechanical shaft power.

5. The gasification power plant of claim 4, wherein the primary fuel flow comprises syngas and the secondary fuel flow comprises natural gas.

6. A gasification power plant comprising:
a compressor receiving an ambient air flow and producing a compressed air flow;
an air separation unit receiving an air separation unit portion of the compressed air flow, and producing a nitrogen flow and an oxygen flow;
a gasifier receiving the oxygen flow, carbonaceous fuel, and water, and producing a primary fuel flow;
a fuel supply providing a secondary fuel flow;
a catalytic combustor comprising a flow path receiving a combustor portion of the compressed air flow, a fuel/air mixer combining a first fuel portion of at least one of the primary fuel flow and secondary fuel flow and a mixer portion of the combustor portion to produce a combustible mixture; a fuel/nitrogen mixer combining a second fuel portion of at least one of the primary fuel flow and secondary fuel flow and the nitrogen flow to produce a fuel/nitrogen mixture, a backside mixing flow path combining the fuel/nitrogen mixture and a backside cooling portion of the combustor portion to produce a fuel/nitrogen/air mixture, a catalytic element having a catalytically active flow path receiving the combustible mixture and producing a partially combusted mixture and a backside cooling flow path receiving the fuel/nitrogen/air mixture and producing a heated mixture, the partially combusted mixture and the heated mixture combining downstream of the catalytic element to produce a hot combustion gas; and a turbine receiving the hot combustion gas and expanding the hot combustion gas to extract mechanical shaft power.

7. The gasification power plant of claim 6, wherein:
the first fuel portion comprises about 70% to 80% by volume of at least one of the primary fuel flow and secondary fuel flow; and the second fuel portion comprises about 20% to 30% by volume of at least one of the primary fuel flow and secondary fuel flow.

8. The gasification power plant of claim 6, wherein the primary fuel flow comprises syngas and the secondary fuel flow comprises natural gas.

9. A gasification power plant comprising:
a compressor receiving an ambient air flow and producing a compressed air flow;
an air separation unit receiving an air separation unit portion of the compressed air flow, and producing a nitrogen flow and an oxygen flow;
a gasifier receiving the oxygen flow, carbonaceous fuel, and water, and producing a primary fuel flow;
a fuel supply providing a secondary fuel flow;
a catalytic combustor comprising a first fuel/air mixer receiving a first combustor portion of the compressed air flow and combining a first fuel portion of at least one of the primary fuel flow and secondary fuel flow and the first combustor portion to produce a first combustible mixture; an air flow path receiving a second combustor portion of the compressed air flow, a second fuel/air mixer combining the first combustible mixture and a mixer portion of the second combustor portion to produce a second combustible mixture; a fuel/nitrogen mixer combining a second fuel portion of at least one of the primary fuel flow and secondary fuel flow and the nitrogen flow to produce a fuel/nitrogen mixture, a backside mixing flow path combining the fuel/nitrogen mixture and a backside cooling portion of the second combustor portion to produce a fuel/nitrogen/air mixture, a catalytic element having a catalytically active flow path receiving the second combustible mixture and producing a partially combusted mixture and a backside cooling flow path receiving the fuel/nitrogen/air mixture and producing a heated mixture, the partially combusted mixture and the heated mixture combining downstream of the catalytic element to produce a hot combustion gas; and a turbine receiving the hot combustion gas and expanding the hot combustion gas to extract mechanical shaft power.

10. The gasification power plant of claim 9, further comprising:
a casing disposed around a downstream end of the catalytic combustor receiving the combustor portion; and
a bypass conduit conducting the first combustor portion from the casing to the first fuel/air mixer.

11. The gasification power plant of claim 10, further comprising an eductor disposed in the bypass conduit upstream of the first fuel/air mixer and receiving a third fuel portion of at least one of the primary fuel and the secondary fuel to pump the first combustor portion flowing through the bypass conduit.

12. The gasification power plant of claim 9, wherein:
the first fuel portion comprises about 70% to 80% by volume of at least one of the primary fuel flow and secondary fuel flow; and
the second fuel portion comprises about 20% to 30% by volume of at least one of the primary fuel flow and secondary fuel flow.

13. The gasification power plant of claim 9, wherein the primary fuel flow comprises syngas and the secondary fuel flow comprises natural gas.

14. A gasification power plant comprising:
means for receiving an ambient air flow and producing a compressed air flow;
means for receiving an air separation unit portion of the compressed air flow, and producing a nitrogen flow and an oxygen flow;
means for receiving the oxygen flow, carbonaceous fuel, and water, and producing a primary fuel flow;
means for providing a secondary fuel flow;
means for catalytically combusting a fuel/air mixture comprising an air mixing flow path combining the nitrogen flow and a combustor portion of the compressed air flow to form a diluted air flow , a fuel/air mixer combining at least one of the primary fuel flow and secondary fuel flow and a mixer portion of the diluted air flow to produce a combustible mixture; a catalytic element having a catalytically active flow path receiving the combustible mixture and producing a partially combusted mixture and a backside cooling flow path receiving a backside cooling portion of the diluted air flow and producing a heated flow, the partially combusted mixture and the heated flow combining downstream of the catalytic element to produce a hot combustion gas; and means for receiving the hot combustion gas and expanding the hot combustion gas to extract mechanical shaft power.

15. A gasification power plant comprising:
a compressor receiving an ambient air flow and producing a compressed air flow;
an air separation unit receiving an air separation unit portion of the compressed air flow, and producing a nitrogen flow and an oxygen flow;
a gasifier receiving the oxygen flow, carbonaceous fuel, and water, and producing a relatively lower BTU primary fuel flow;
a fuel supply providing a relatively higher BTU secondary fuel flow;
a catalytic combustor comprising a catalytically active flow path and a backside cooling flow path for combusting a fuel/air mixture flow to produce a hot combustion gas;
a means for providing the fuel/air mixture flow to the catalytically active flow path including a means for utilizing a selected one of the relatively lower BTU primary fuel flow and the relatively higher BTU fuel flow for forming the fuel/air mixture flow;
a means for providing a cooling fluid flow comprising a backside cooling portion of the compressed air flow to the backside cooling flow path;
a means for selectively adding a portion of the nitrogen flow to at least one of the fuel/air mixture flow and the cooling fluid flow when the relatively lower BTU fuel is selected for the fuel/air mixture and for not adding the portion of the nitrogen flow when the relatively higher BTU fuel is selected; and
a turbine receiving the hot combustion gas and expanding the hot combustion gas to extract mechanical shaft power.

16. The gasification power plant of claim 15, wherein the catalytic combustor further comprises a flow path receiving a combustor portion of the compressed air flow, a fuel/air mixer combining a first fuel portion of at least one of the primary fuel flow and secondary fuel flow and a mixer portion of the combustor portion to produce a combustible mixture; a fuel/nitrogen mixer combining a second fuel portion of at least one of the primary fuel flow and secondary fuel flow and the nitrogen flow to produce a fuel/nitrogen mixture, a backside mixing flow path combining the fuel/nitrogen mixture and a backside cooling portion of the combustor portion to produce a fuel/nitrogen/air mixture, a catalytic element having a catalytically active flow path receiving the combustible mixture and producing a partially combusted mixture and a backside cooling flow path receiving the fuel/nitrogen/air mixture and producing a heated combustible mixture, a bypass conduit receiving a third fuel portion of at least one of the primary fuel flow and secondary fuel flow and discharging the third fuel portion downstream of the catalytic element to combine with the partially combusted mixture and the heated combustible mixture discharged from the catalytic element to produce a hot combustion gas.

17. The gasification power plant of claim 16, wherein the first fuel portion comprises about 40% to 50% by volume of at least one of the primary fuel flow and secondary fuel flow.

18. The gasification power plant of claim 16, wherein the second fuel portion comprises about 20% to 30% by volume of at least one of the primary fuel flow and secondary fuel flow.

19. The gasification power plant of claim 16, wherein the third fuel portion comprises about 30% to 40% by volume of at least one of the primary fuel flow and secondary fuel flow.

20. The gasification power plant of claim 16, wherein the primary fuel flow comprises syngas and the secondary fuel flow comprises natural gas.

* * * * *